Nov. 17, 1953 A. MOSSO ET AL 2,659,219
RESILIENT JOINT FOR TRANSMISSION SHAFTS OF MOTOR VEHICLES
Filed June 27, 1950
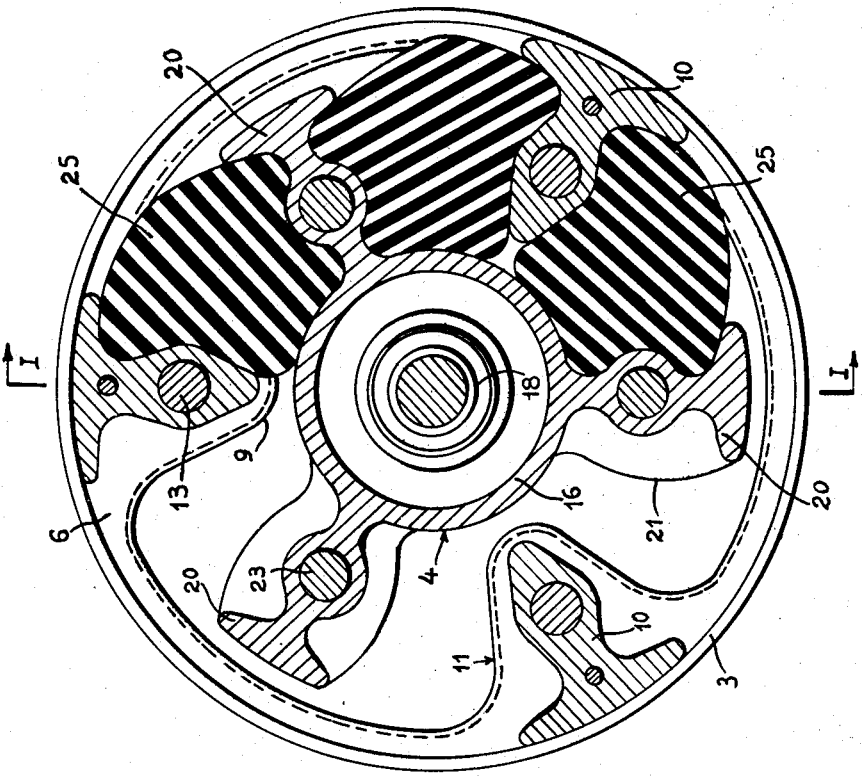
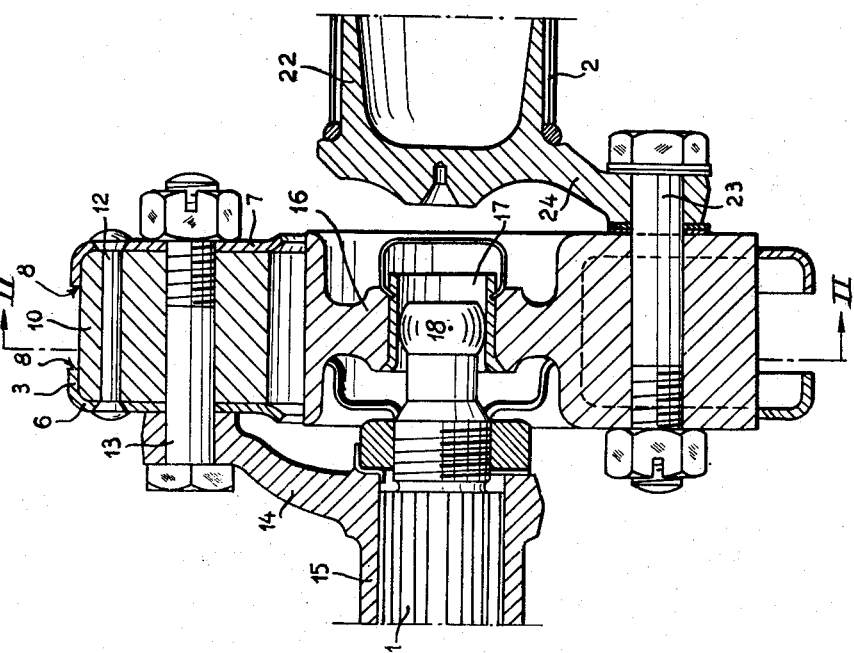

Patented Nov. 17, 1953

2,659,219

UNITED STATES PATENT OFFICE 2,659,219

RESILIENT JOINT FOR TRANSMISSION SHAFTS OF MOTOR VEHICLES

Angelo Mosso and Vittorio Montanari, Turin, Italy, assignors to Fiat S. p. A., Turin, Italy Application June 27, 1950, Serial No. 170,563

Claims priority, application Italy June 30, 1949

3 Claims. (Cl. 64—14)

This invention relates to a resilient joint or coupling, more particularly for transmission shafts of motor vehicles, having a high torque capacity and axial flexibility. The resilient coupling in accordance with the invention makes it possible to dispense with the usual blind coupling on the transmission.

It is an object of the present invention to provide an improved resilient coupling having radial arms of one coupling member interposed between radial arms of a second coupling member and precompressed rubber blocks held between the arms, the blocks being confined in an axial direction as well as in radial and circumferential directions.

A further object of the invention is to provide a resilient coupling that is of simple construction and has high torque-carrying capacity while being of relatively light weight.

Other objects and advantages of the invention will become apparent from the following description and claims in conjunction with the accompanying drawings, in which:

Fig. 1 is a longitudinal section of a resilient coupling in accordance with the invention, the section being taken approximately on the line I—I of Fig. 2.

Fig. 2 is a cross section of the coupling in two different planes, as indicated by the line II—II in Fig. 1.

In the drawings, there is shown a resilient coupling in accordance with the invention connecting a driving shaft 1 with a driven shaft 2 (Fig. 1). The resilient coupling comprises a driving member 3 (Fig. 2) and a driven member 4. The driving member 3 comprises two sheet metal rings 6 and 7 having axially extending peripheral flanges 8 that project toward one another and a plurality of circumferentially spaced, radially inwardly projecting portions or "peninsulas" 9 (Fig. 2). The inwardly projecting positions 9 of one ring are aligned in an axial direction with those of the other, each ring being shown with three equally spaced inwardly projecting portions. An equal number of intermediate members 10 formed of light metal alloy and interposed between the inwardly projecting portion 9 of the two rings 6 and 7 constitute radially projecting arms which, in a section taken perpendicular to the axis of rotation (Fig. 2), are substantially T-shaped with the cross bars of the T's disposed circumferentially just inside the axially projecting peripheral flanges 8. As will be seen in Fig. 2, the radially inwardly projecting portions 9 of the rings 6 and 7 are larger than the cross section of the arm members 10 so as to project beyond the arm members in a circumferential direction to provide flange portions 11. The two rings 6 and 7 and the interposed arm members 10 are held in assembled relation by means of rivets 12 and bolts 13 which extend through holes provided in the radially inwardly projecting portions 9 of the two rings and aligned axially extending holes through the arm members 10. The bolts 13 also extend through holes in the ends of radially projecting arms 14 of a spider 15 secured on the end portion of the driving shaft 1, thereby securing the driving member 3 of the coupling to the driving shaft.

The driven member 4 of the coupling comprises a hub portion 16 having an axial bore with a bushing 17 that engages a head 18 with a spherical surface provided on the end of the driving shaft 1. The driving and driven members of the coupling are thereby maintained substantially concentric with one another. A plurality of arms 20 radiate from the hub portion 16 of the driven member of the coupling (Fig. 2), the number being equal to the number of arms 10 of the driving member. The radially projecting arms 20 are T-shaped in a section taken perpendicular to the axis of rotation (Fig. 2) with the cross bars of the T's at the outer ends of the arms and disposed circumferentially. At the opposite ends of the arms 20 in an axial direction, there are provided flanges 21 that project in a circumferential direction from the arms so that the arms 20, in circumferential section, i. e. a section taken on a theoretical cylinder coaxial with the driven member of the coupling, have an H shape. The flanges 21 lie in approximately the same plane as the radially inwardly projecting portions 9 of the rings 6 and 7, and are interposed between these inwardly projecting portions.

The driven member 4 of the coupling is secured to a spider 22 on the driven shaft 2 by means of bolts 23 which extend through holes in the arm 24 of the spider and through axially extending holes provided in the arms 20. The bolts 23 which secure the driven member to the spider 22 and the bolts 13 that secure the driving member to the spider 14 are disposed approximately in a circle midway, in a radial direction, between the hub portion 16 of the driven member and the peripheral flanges 8 on the driving member.

Rubber blocks 25 are held under pressure between the arm members 10 of the driving member 3 and the arm members 20 of the driven member 4. The rubber blocks 25 are precompressed and are confined in a circumferential direction by the arms 10 and 20 and in a radial direction by the hub portion 16 of the driven member, the circumferentially extending cross bar portions of the T-shaped arms 10 and 20 and by the peripheral flange portions 8 of the rings 6 and 7. The rubber blocks are also retained in an axial direction by the flange portions 11 of the rings 6 and 7 and the interposed flange portions 21 of the arms 20. The prestressing of the rubber blocks is such that they constantly operate in a compressed condition. The flexible coupling is thus capable of transmitting a high torque.

What we claim is:

1. In a resilient coupling for two transmission shafts disposed end to end, spiders on the adjacent ends of said shafts, a coupling member comprising a hub portion and a plurality of arms radiating from said hub, said arms being flanged so as to be H-shaped in circumferential section and being T-shaped, in a section taken perpendicular to the axis of rotation, with the cross bar of the T disposed circumferentially and with holes extending axially through said arms, bolts in said holes securing said coupling member to the spider on one shaft, a second coupling member comprising a pair of rings having circumferentially-spaced radially inwardly projecting portions, radially disposed arm portions between the inwardly projecting portions of the rings, said arms and inwardly projecting portions having aligned axial holes, bolts extending through said holes to secure said rings and interposed arms together and to secure the assembly comprising said rings and interposed arms to the spider on the other shaft, the radially inwardly projecting portions of said rings extending beyond the interposed arms in a circumferential direction to provide flanges at the opposite sides of said arms, and rubber blocks held under pressure in radial and circumferential directions between the arms of the first mentioned member and the arms of said second member and being held under compression in an axial direction by said rings and the flanges of said first mentioned arms.

2. In a resilient coupling for two transmission shafts disposed end to end, spiders on the adjacent ends of said shafts, a coupling member comprising a hub portion and a plurality of arms radiating from said hub, said arms being T-shaped, in a section taken perpendicular to the axis of rotation of said hub portion, with the cross bar of the T disposed circumferentially and with holes extending axially through said arms, bolts in said holes securing said coupling member to the spider on one shaft, a second coupling member comprising a ring surrounding the first mentioned coupling member and a plurality of arms projecting inwardly toward said hub portion, the arms of said second member being interposed between the arms of the first coupling member and being T-shaped with the cross bars of the T disposed circumferentially and with holes extending axially through the arms of said second member, bolts in said last mentioned holes securing said second member to the spider on the other shaft, and rubber blocks held under pressure between the arms of said first member and the arms of said second member, said arms having flanges at their axial ends, said flanges being disposed substantially in planes perpendicular to the axis of rotation and projecting in a circumferential direction on opposite sides of the arms to embrace the ends of said rubber blocks and holding them under compression in an axial direction, the flanges on the arms of said coupling member being interposed between the flanges on the arms of said second member.

3. In a resilient coupling for two transmission shafts disposed end to end, spiders on the adjacent ends of said shafts, a coupling member comprising a hub portion and a plurality of arms radiating from said hub, said arms being T-shaped in a section perpendicular to the axis of rotation, with the cross bar of the T disposed circumferentially and having flanges at opposite sides of said arms disposed approximately in planes perpendicular to the axis of said coupling to define an H shape in circumferential section, axial holes being provided in said arms, bolts in said holes securing said coupling member to the spider on one shaft, a second coupling member comprising a pair of rings having axially extending peripheral flanges projecting toward one another and circumferentially spaced radially inwardly projecting portions and radially disposed arms interposed between the inwardly projecting portions of the rings, said arms and the radially inwardly projecting portions of the rings having aligned axial holes, bolts extending through said holes to secure said rings and interposed arms together and to secure the assembly comprising said rings and interposed arms to the spider on the other shaft, the radially inwardly projecting portions of said rings extending beyond the interposed arms in a circumferential direction to provide flanges at the opposite sides of said arms, and rubber blocks held under pressure between the arms of the first mentioned member and the arms of said second member, said blocks being held under compression in an axial direction by said flanges.

ANGELO MOSSO.
VITTORIO MONTANARI.

References Cited in the file of this patent

UNITED STATES PATENTS

| Number | Name | Date |
|---|---|---|
| 472,707 | Hunt | Apr. 12, 1892 |
| 1,443,440 | Spicer et al. | Jan. 30, 1923 |
| 1,561,476 | Masury et al. | Nov. 17, 1925 |
| 2,200,641 | Ricefield | May 14, 1940 |